Nov. 30, 1948.       R. M. RUNGE       2,455,141
WIRING CHANNEL HANGER
Filed July 26, 1946
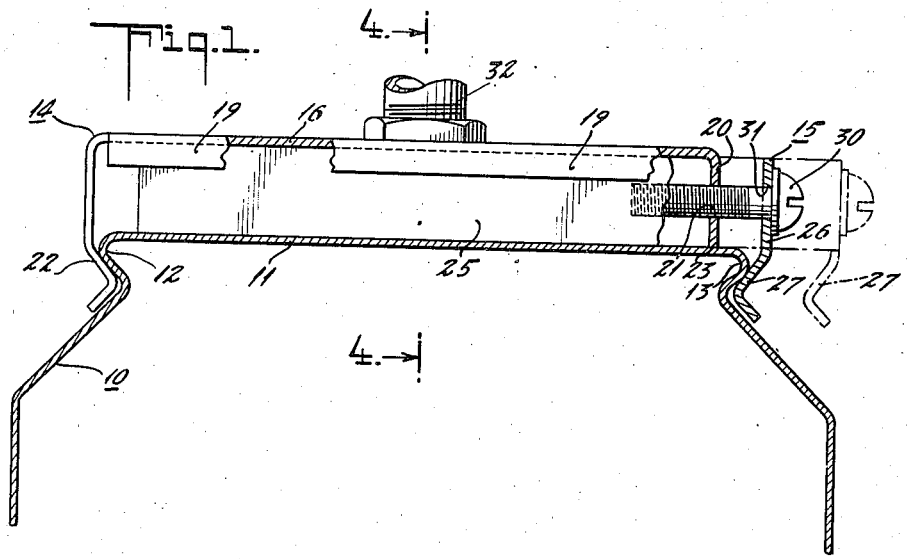
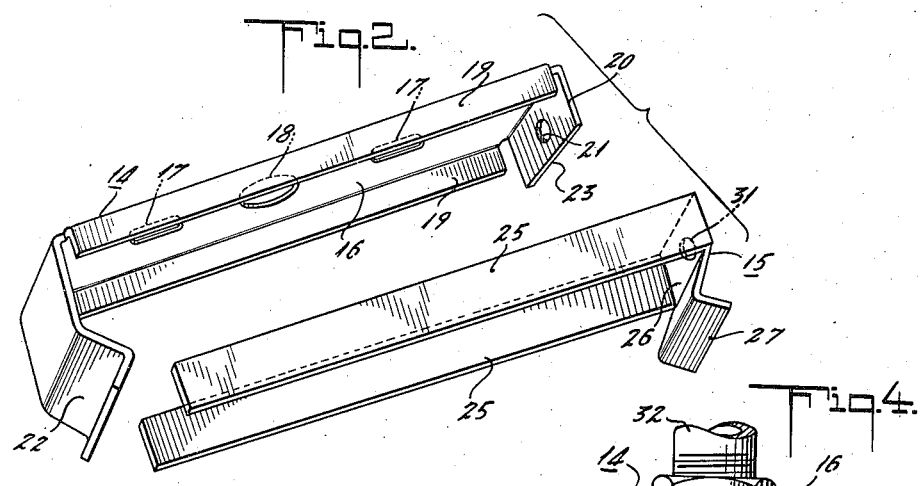
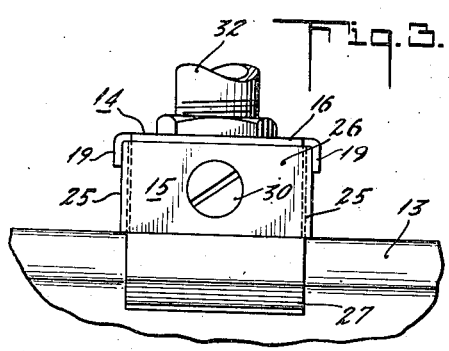
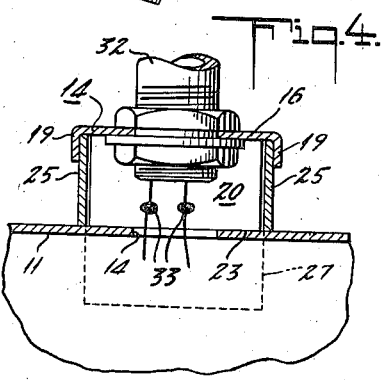
INVENTOR
RICHARD M. RUNGE
BY
Joel B. Liberman
ATTORNEY Patented Nov. 30, 1948

2,455,141

UNITED STATES PATENT OFFICE 2,455,141

WIRING CHANNEL HANGER

Richard M. Runge, Meriden, Conn., assignor to The Miller Company, Meriden, Conn., a corporation of Connecticut Application July 26, 1946, Serial No. 686,577

5 Claims. (Cl. 248—343)

1

The present invention relates to wiring channel hangers and is more particularly directed toward hangers for supporting beaded wireways or wiring channels employed in fluorescent lighting equipment.

The present invention contemplates hangers for the above purposes designed especially for use where it is desired to mount the beaded wireway as close as possible to the ceiling. The same construction, however, is suitable for use with pendent hangers such as rods and tubes. The present invention contemplates that the hanger not only will be suitable for supporting the wireway from the ceiling, the hanger rod or tubes, but can also be used as a splicing box to permit splicing wires whenever necessary.

The accompanying drawings show, for purposes of illustrating the present invention, an embodiment in which the invention may take form, it being understood that the drawings are illustrative of the invention rather than limiting the same.

In these drawings:

Figure 1 is a transverse sectional view through a wiring conduit and hanger with parts broken away to show interior construction;

Figure 2 is an exploded perspective view showing the parts;

Figure 3 is an elevational view taken from the right of Figure 1;

Figure 4 is a section taken on the line 4—4 of Figure 1.

The wireway such as shown at 10 has a flat upper wall 11 with beads 12 and 13 along its sides. It may be provided with a knockout opening indicated at 14. The hanger is made in two parts which are designated by the reference characters 14 and 15. The part 14 has a flat upper wall 16 which may be provided with openings 17—17 for screws and 18 for a rod or conduit. The upper part 14 has side flanges 19—19, a flange 20 at one end, provided with a tapped hole 21, and a hook 22 at the other end. The depth of the flange 20 and the hook 22 is typically such that when the hook is engaged behind the bead of the wiring channel, the lower edge 23 of the flange 20 will rest on the top of the wiring channel adjacent the opposite bead and hold the upper wall 16 of the upper part 14 parallel with the top of the wiring channel.

The other hanger forming part 15 has two parallel sides 25—25, an interconnecting wall 26 and a hook 27. The sides 25—25 are spaced so as to fit under the top wall 16 of the other hanger

2 part and inside the flanges 19, and the vertical depth is such as to fill the space between the top of the wiring conduit and the bottom of the top part 16. A screw 30 is passed through the hole 31 in the connecting portion 26 of the U-shaped lower hanger part and is threaded into the tapped hole 21 so as to make it possible to clamp the two hanger parts against the wiring channel.

The entire structure may be supported either by screws passed up through the slots 17 or by a conduit such as indicated at 32 secured in place as indicated. Whenever desired the wires can be spliced in the space provided above the wiring channel and inside the hanger. Such splicing is diagrammatically illustrated at 33 in Figure 4.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. In combination, a wiring channel having a flat normally horizontal upper surface and longitudinal beads along its side walls and adjacent the upper surface, and a channel hanger extending transversely of the channel, the hanger having one part provided with a hook engaging one of the beads and two parallel, vertical elements spaced apart and in contact with the upper surface of the wiring channel, a second part having a hook engaging the other bead, an upper wall engaging the upper edges of the parallel vertical elements, and a downwardly extending end terminating above the channel, and threaded means intermediate said end and hook carrying end of the first part for clamping the channel between the hooks.

2. The combination claimed in claim 1, wherein the threaded means includes a beaded screw passing through a hole in the end of the first part and threaded into the second part.

3. A combined splicing box and wiring channel hanger, comprising two telescoping parts, one having a wiring channel engaging hook at one end, an upper wall with hanger rod receiving opening and an end wall opposite the hook, the other being U-shaped in horizontal section with the sides of the U under the said upper wall to form sides for the splicing box, the middle of the U carrying a wiring channel engaging hook, and bolt means interconnecting the end wall of the first part and middle of the U together so that one part may slide relative to the other part and clamping pressure be exerted against a wiring channel.

4. A combined splicing box and wiring channel hanger, comprising upper and lower telescoping parts each having a depending hook at one end engageable under the bead of a wiring channel, the upper part having a flat top provided with a conduit receiving opening, longitudinal flanges and an end flange opposite the hook and provided with a threaded hole, the lower part having side flanges inside the longitudinal flanges of the upper part and a hole opposite the threaded hole, and a clamping screw passing through the last mentioned hole and threaded into the first mentioned hole.

5. In combination, a wiring channel having a flat, normally horizontal upper surface and longitudinal beads along its side walls and adjacent the upper surface, and a channel hanger extending transversely of the channel, the hanger having two telescoping parts each with a hook to engage under the corresponding bead on the channel, and a horizontal clamping screw extending through one part and threaded into the other, one of the parts having vertical parallel spaced apart channel engaging elements, the other having an inverted channel shaped configuration and overlying the upper edges of the vertical elements.

RICHARD M. RUNGE.

REFERENCES CITED

The following references are of record in the file of this patent:

UNITED STATES PATENTS

| Number | Name | Date |
|---|---|---|
| 2,297,869 | Biller | Oct. 6, 1942 |